(12) United States Patent
Wang et al.

(10) Patent No.: US 12,451,257 B2
(45) Date of Patent: Oct. 21, 2025

(54) ELECTROCARDIOGRAM MAPPING METHOD AND SYSTEM

(71) Applicant: Tiangong University, Tianjin (CN)

(72) Inventors: Huiquan Wang, Tianjin (CN); Feng Cao, Tianjin (CN); Xin Lian, Tianjin (CN); Jialiang Miao, Tianjin (CN)

(73) Assignee: Tiangong University, Tianjin (CN)

( * ) Notice: Subject to any disclaimer, the term of this patent is extended or adjusted under 35 U.S.C. 154(b) by 177 days.

(21) Appl. No.: 17/762,059

(22) PCT Filed: Apr. 25, 2021

(86) PCT No.: PCT/CN2021/089629
§ 371 (c)(1),
(2) Date: Mar. 19, 2022

(87) PCT Pub. No.: WO2022/198740
PCT Pub. Date: Sep. 29, 2022

(65) Prior Publication Data
US 2025/0087371 A1    Mar. 13, 2025

(30) Foreign Application Priority Data
Mar. 23, 2021 (CN) .......................... 202110308434.8

(51) Int. Cl.
*G16H 50/70* (2018.01)
*A61B 5/00* (2006.01)

(52) U.S. Cl.
CPC ........... *G16H 50/70* (2018.01); *A61B 5/7246* (2013.01); *A61B 5/7267* (2013.01)

(58) Field of Classification Search
CPC ...... G16H 50/70; A61B 5/7246; A61B 5/7267
See application file for complete search history.

(56) References Cited

U.S. PATENT DOCUMENTS

| | | | | |
|---|---|---|---|---|
| 6,152,883 A | * | 11/2000 | Blanchett | A61B 5/7253 600/509 |
| 2001/0056245 A1 | * | 12/2001 | Mlynash | A61B 5/35 600/513 |

(Continued)

FOREIGN PATENT DOCUMENTS

| CN | 101384214 A | 3/2009 |
|---|---|---|
| CN | 104463326 A | 3/2015 |

(Continued)

OTHER PUBLICATIONS

Jin, Zhanpeng, et al. "HeartToGo: a personalized medicine technology for cardiovascular disease prevention and detection." 2009 IEEE/NIH Life Science Systems and Applications Workshop. IEEE, 2009 (Year: 2009).*

(Continued)

*Primary Examiner* — Shahid K Khan
(74) *Attorney, Agent, or Firm* — Loginov & Associates, PLLC; William A. Loginov (57) ABSTRACT

The present disclosure relates to an electrocardiogram (ECG) mapping method and system. By acquiring a palm ECG signal, dividing the palm ECG signal into multiple palm ECG episodes according to a preset intercepted length, converting the palm ECG episodes into standard ECG episodes with an ECG mapping model, and connecting all standard ECG episodes according to a connection sequence of the multiple palm ECG episodes to obtain a standard ECG signal corresponding to the palm ECG signal, the present disclosure establishes a mapping relationship between the palm ECG and the standard ECG with the ECG mapping model to implement the waveform conversion from the palm ECG to the standard ECG, and the converted standard ECG is highly similar to the 12-lead standard ECG, thus preventing the misdiagnosis.

5 Claims, 6 Drawing Sheets

(56) References Cited

U.S. PATENT DOCUMENTS

| | | | | |
|---|---|---|---|---|
| 2009/0018459 | A1* | 1/2009 | Tseng | A61B 5/341 600/509 |
| 2009/0275849 | A1* | 11/2009 | Stewart | A61B 5/02405 600/518 |
| 2012/0330170 | A1* | 12/2012 | Chiu | A61B 5/341 600/509 |
| 2016/0106991 | A1* | 4/2016 | Stadler | A61N 1/3987 607/5 |
| 2017/0000370 | A1* | 1/2017 | Hyde | G16H 15/00 |
| 2018/0140203 | A1* | 5/2018 | Wang | A61B 5/369 |
| 2018/0338147 | A1* | 11/2018 | Nowozin | H04N 19/97 |
| 2021/0353166 | A1* | 11/2021 | Sirendi | G16H 50/20 |
| 2022/0110021 | A1* | 4/2022 | Livne | H04W 28/0942 |
| 2022/0183606 | A1* | 6/2022 | Wu | A61B 5/327 |

FOREIGN PATENT DOCUMENTS

| | | | | |
|---|---|---|---|---|
| CN | 104523264 | A | | 4/2015 |
| CN | 105943022 | A | | 9/2016 |
| CN | 107613859 | A | | 1/2018 |
| CN | 109431492 | A | | 3/2019 |
| CN | 110507313 | A | * | 11/2019 ........... A61B 5/7267 |
| CN | 111134657 | A | * | 5/2020 ............. A61B 5/318 |
| CN | 111956203 | A | * | 11/2020 ........... A61B 5/7267 |
| EP | 2233069 | A1 | * | 9/2010 ............. A61B 5/327 |
| EP | 2238897 | A1 | * | 10/2010 ........... A61B 5/7267 |
| TW | 201740349 | A | * | 11/2017 ............. G06T 7/001 |
| WO | 2015083036 | A1 | | 6/2015 |

OTHER PUBLICATIONS

Yang, Jianli, et al. "A novel method of diagnosing premature ventricular contraction based on sparse auto-encoder and softmax regression." Bio-medical materials and engineering 26.1_suppl (2015): S1549-S1558 (Year: 2015).*

Zhu, Qiang, et al. "Learning your heart actions from pulse: ECG waveform reconstruction from PPG." IEEE Internet of Things Journal 8.23 (2021): 16734-16748. (Year: 2021).*

Narayanan, Deepak, et al. "PipeDream: Generalized pipeline parallelism for DNN training." Proceedings of the 27th ACM symposium on operating systems principles. 2019. (Year: 2019).*

Chiu, Hong-Yu, Hong-Han Shuai, and Paul C-P. Chao. "Reconstructing QRS complex from PPG by transformed attentional neural networks." IEEE Sensors Journal 20.20 (2020): 12374-12383. (Year: 2020).*

Wang et al., "A novel method based on convolutional neural networks for deriving standard 12-lead ECG from serial 3-lead ECG", Front Inform Technol Electron Eng, 2019, 20(3) 405-413.

* cited by examiner

ELECTROCARDIOGRAM MAPPING METHOD AND SYSTEM

CROSS REFERENCE TO RELATED APPLICATION

This application claims priority to the Chinese Patent Application No. 202110308434.8, filed with the China National Intellectual Property Administration (CNIPA) on Mar. 23, 2021, and entitled "ELECTROCARDIOGRAM MAPPING METHOD AND SYSTEM", which is incorporated herein by reference in its entirety.

TECHNICAL FIELD

The present disclosure relates to the technical field of electrocardiogram (ECG) signal processing, and in particular, to an ECG mapping method and system.

BACKGROUND ART

The 12-lead electrocardiogram (ECG) is an important basis for clinical diagnosis of cardiovascular diseases, and locations for obtaining the 12-lead ECG are also the internationally adopted anatomical locations for a human body. The 12-lead ECG is measured inconveniently in emergency use, because electrodes are attached necessarily by the professionals, and many complicated lead wires are involved.

In the prior art, a method for quickly measuring an all-lead ECG signal is provided. With a glove as a carrier for acquiring the palm ECG, the device can quickly provide diagnostic references for doctors and is of great significance to the emergency use. However, the palm ECG cannot completely replace the standard ECG but is just similar to the standard ECG. Compared with the standard ECG, waveforms on some positions of the palm ECG are not obvious, particularly on leads associated with the limb electrodes, thus causing potential missed diagnosis or misdiagnosis of some diseases.

SUMMARY

An objective of the present disclosure is to provide an ECG mapping method and system. The present disclosure establishes a mapping relationship between the palm ECG and the standard ECG to implement waveform conversion from the palm ECG to the standard ECG, and the converted standard ECG is highly similar to the 12-lead standard ECG, thus preventing the misdiagnosis.

To implement the above objectives, the present disclosure provides the following solutions.

An ECG mapping method includes the following steps:
acquiring a palm ECG signal, the palm ECG signal including multiple complete ECG cycles;
dividing the palm ECG signal into multiple palm ECG episodes according to a preset intercepted length;
converting the palm ECG episodes into standard ECG episodes with an ECG mapping model; and
connecting all standard ECG episodes according to a connection sequence of the multiple palm ECG episodes to obtain a standard ECG signal corresponding to the palm ECG signal.

An ECG mapping system includes:
an acquisition module, configured to acquire a palm ECG signal, the palm ECG signal including multiple complete ECG cycles;
a division module, configured to divide the palm ECG signal into multiple palm ECG episodes according to a preset intercepted length;
a conversion module, configured to convert the palm ECG episodes into standard ECG episodes with an ECG mapping model; and
a connection module, configured to connect all standard ECG episodes according to a connection sequence of the multiple palm ECG episodes to obtain a standard ECG signal corresponding to the palm ECG signal.

Based on specific embodiments provided by the present disclosure, the present disclosure has the following technical effects:

The ECG mapping method and system provided by the present disclosure are implemented by acquiring a palm ECG signal, dividing the palm ECG signal into multiple palm ECG episodes according to a preset intercepted length, converting the palm ECG episodes into standard ECG episodes with an ECG mapping model; and connecting all standard ECG episodes according to a connection sequence of the multiple palm ECG episodes to obtain a standard ECG signal corresponding to the palm ECG signal. Therefore, the present disclosure establishes a mapping relationship between the palm ECG and the standard ECG with the ECG mapping model to implement the waveform conversion from the palm ECG to the standard ECG, and the converted standard ECG is highly similar to the 12-lead standard ECG, thus preventing the misdiagnosis. With the ECG mapping method and system provided by the present disclosure, the palm ECG is acquired first and then converted into the standard ECG in emergency use, so not only is the speed for acquiring the ECG signal fast, but the converted standard ECG is highly similar to the standard ECG acquired by the electrodes, thus preventing the misdiagnosis.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and a person of ordinary skill in the art may still derive other accompanying drawings from these accompanying drawings without creative efforts.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely a part rather than all of the embodiments of the present disclosure. Based on the embodiments of the present disclosure, all other embodiments obtained by the person of ordinary skill in the art without creative efforts shall fall within the protection scope of the present disclosure.

An objective of the present disclosure is to provide an ECG mapping method and system. The present disclosure establishes a mapping relationship between the palm ECG and the standard ECG to implement waveform conversion from the palm ECG to the standard ECG, and the converted standard ECG is highly similar to the 12-lead standard ECG, thus preventing the misdiagnosis.

To make the above objectives, features, and advantages of the present disclosure clearer and more comprehensible, the present disclosure will be further described in detail below with reference to the accompanying drawings and the specific implementations.

Embodiment 1

Figure 1:
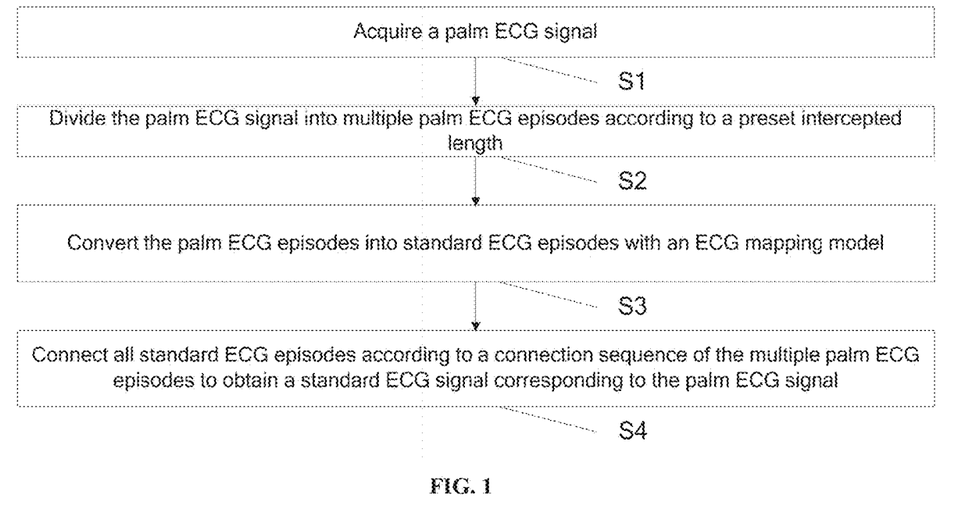
FIG. 1 is a flow chart of an ECG mapping method according to Embodiment 1 of the present disclosure.

The embodiment provides an ECG mapping method. As shown in FIG. 1, the method includes the following steps:

S1: A palm ECG signal is acquired, the palm ECG signal including multiple complete ECG cycles.

Figure 2:
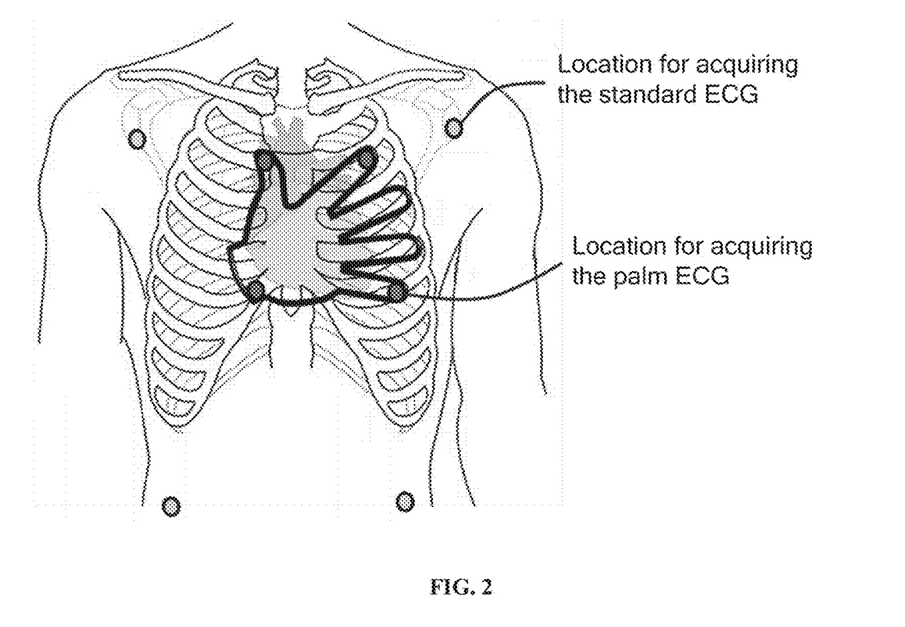
FIG. 2 is a schematic diagram illustrating locations for acquiring a palm ECG and a standard ECG according to Embodiment 1 of the present disclosure.

FIG. 2 illustrates locations for acquiring the palm ECG signal. The existing glove is used to acquire the palm ECG signal of the subject, and the sampling frequency may be 514 Hz. The acquired palm ECG signal should include multiple complete ECG cycles, each complete ECG cycle including PQRST characteristic waves.

S2: The palm ECG signal is divided into multiple palm ECG episodes according to a preset intercepted length.

Figure 3:
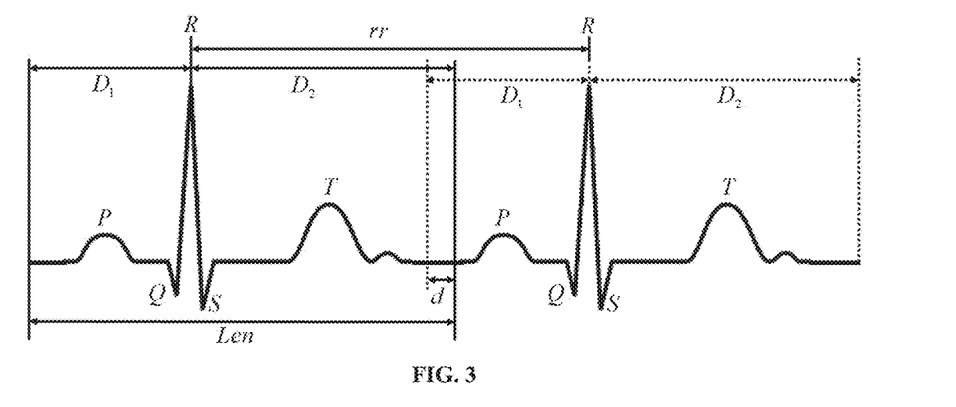
FIG. 3 is a schematic diagram for intercepting an ECG signal according to Embodiment 1 of the present disclosure.

Specifically, as shown in FIG. 3, R waves in the palm ECG signal are taken as reference points; for each of the reference points, a palm ECG signal having a length of $D_1$ is intercepted in a reverse direction of a time axis, and a palm ECG signal having a length of $D_2$ is intercepted in a forward direction of the time axis to obtain a palm ECG episode corresponding to the reference point, a sum of the $D_1$ and the $D_2$ being the preset intercepted length Len; and the palm ECG signal is divided into the multiple palm ECG episodes through multiple reference points. By constructing the appropriate input of the ECG mapping model, the present disclosure converts the palm ECG into the standard ECG with the ECG mapping model.

S3: The palm ECG episodes are converted into standard ECG episodes with an ECG mapping model.

Figure 4:
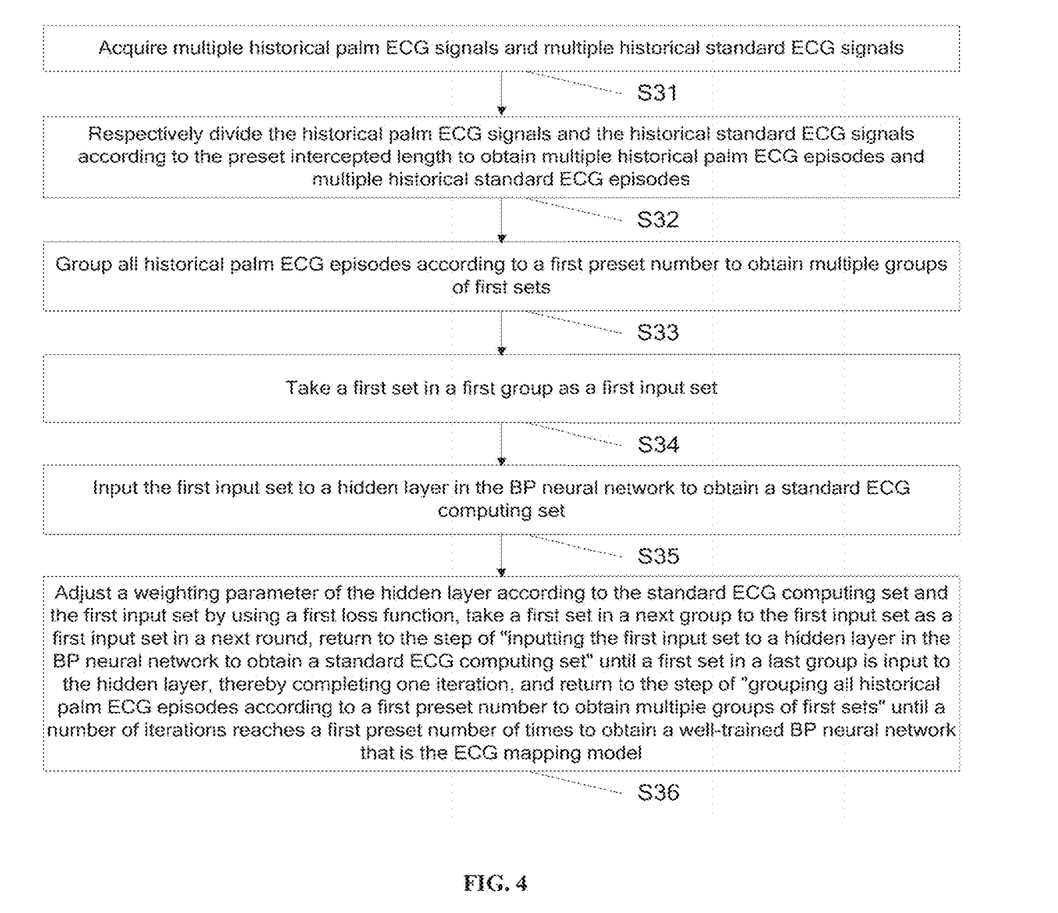
FIG. 4 is a flow chart of a method for training a BP neural network according to Embodiment 1 of the present disclosure.

Presently, deep learning has become an important auxiliary means to process the ECG signal. Algorithms such as convolutional neural network (CNN) and long short-term memory (LSTM) have been widely used to classify the ECG signal, and the classified result can serve as a basis for intelligent disease diagnosis. However, regarding the conversion relationship between two different ECG signals, no research has been dedicated to the deep learning. In response to the waveform conversion from the palm ECG to the standard ECG in the embodiment, the deep leaning method is used, namely, the ECG mapping model is obtained by training a back propagation (BP) neural network. Specifically, as shown in FIG. 4, the process for training the BP neural network may include:

S31: Multiple historical palm ECG signals and multiple historical standard ECG signals are acquired, where the historical palm ECG signals are in one-to-one correspondence with the historical standard ECG signals, and the historical palm ECG signals and the historical standard ECG signals each include multiple complete ECG cycles.

The historical palm ECG signals and the historical standard ECG signals are acquired from the same subject and thus are in one-to-one correspondence. The historical standard ECG signals are obtained by the portable single-lead ECG detection device and specifically by the MLNX wireless remote dynamic ECG monitoring device. The device has a sampling frequency of 514 Hz. For the sake of improving the universality of the ECG mapping model during acquisition, there are normal subjects and subjects suffering from common heart diseases, with the same lying-down posture for measurement. The multiple historical palm ECG signals and historical standard ECG signals are acquired according to the locations shown in FIG. 2. It is to be noted that one complete ECG cycle includes PQRST characteristic waves. As the training data of the ECG mapping model include a variety of normal ECGs and diseased ECGs, the generalization of the model is effectively enhanced, and the error rate that different palm ECGs pass through the ECG mapping model is greatly reduced, thus preventing the misdiagnosis.

S32: The historical palm ECG signals and the historical standard ECG signals are respectively divided according to the preset intercepted length to obtain multiple historical palm ECG episodes and multiple historical standard ECG episodes, where the historical palm ECG episodes and the historical standard ECG episodes are in one-to-one correspondence.

All historical palm ECG signals and historical standard ECG signals may be processed by wavelet denoising or band-pass filtering before divided. The historical standard ECG signals may further be preprocessed, to remove ECG cycles in which cluttered waveforms appear in the historical standard ECG signals; and meanwhile, the corresponding ECG cycles in the historical palm ECG signals are removed. Then, the ECG signals are divided with the method in S2. All historical palm ECG episodes and historical standard ECG episodes are formed into an ECG episode database.

Figure 5:
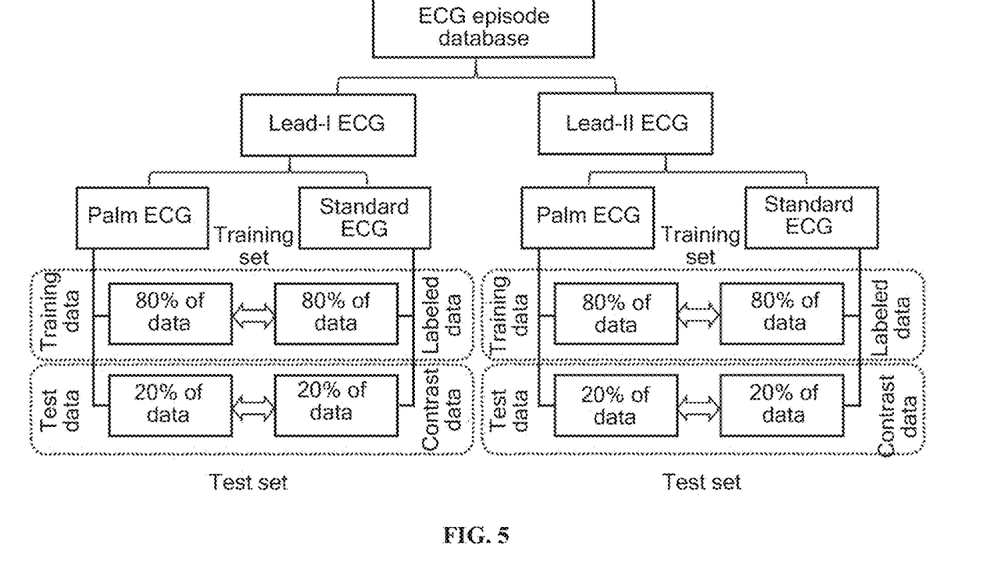
FIG. 5 is a schematic diagram for classifying a training set and a test set according to Embodiment 1 of the present disclosure.

As shown in FIG. 5, for better training effect of the BP neural network, a training set and a test set are classified first, so as to plan the ECG episode database reasonably. 80% of historical palm ECG episodes are used as training data, and 80% of historical standard ECG episodes are used as labeled data, and both are formed into the training set. 20% of historical palm ECG episodes are used as test data, and 20% of historical standard ECG episodes are used as contrast data, and both are formed into the test set.

S33: All historical palm ECG episodes are grouped according to a first preset number to obtain multiple groups of first sets.

The BP neural network includes an input layer, a Mini-batch layer, a hidden layer (which may also be called a fully connected (FC) layer), an output layer and an iterative layer.

The input layer takes 80% of historical palm ECG episodes as the training data, with a dimension of N×Len, and 80% of historical standard ECG episodes as the labeled data, with a dimension of N×Len. It further takes 20% of historical palm ECG episodes as the test data, with a dimension of 0.25N×Len, and 20% of historical standard ECG episodes as the contrast data, with a dimension of 0.25N×Len During specific implementation, a part of the historical palm ECG episodes may be grouped according to the first preset number. Specifically in the embodiment, 80% of historical palm ECG episodes are grouped according to the first preset number.

On the Mini-batch layer, the historical palm ECG episodes are grouped according to the first preset number p'; and each group includes p' historical palm ECG episodes and there are N/p' groups of first sets in total. The historical palm ECG episodes in the first set of each group enter the hidden layer one by one, namely the dimension of the data entering the hidden layer is 1×Len.

S34: A first set in a first group is taken as a first input set.

S35: The first input set is input to a hidden layer in the BP neural network to obtain a standard ECG computing set.

According to the first input set, the hidden layer computes the standard ECG computing set corresponding to the first input set Each standard ECG computing episode in the standard ECG computing set corresponds to one historical palm ECG episode in the first input set. After processed by the hidden layer, the standard ECG computing episodes are output from the output layer. The standard ECG computing episodes have a dimension of 1×Len After the p' historical palm ECG episodes are completely processed by the hidden layer, the standard ECG computing set having a dimension of p'×Len is output from the output layer.

S36: A weighting parameter of the hidden layer is adjusted according to the standard ECG computing set and the first input set by using a first loss function, a first set in a next group to the first input set is taken as a first input set in a next round, the step of "inputting the first input set to a hidden layer in the BP neural network to obtain a standard ECG computing set" is returned until a first set in a last group is input to the hidden layer, thereby completing one iteration, and the step of "grouping all historical palm ECG episodes according to a first preset number to obtain multiple groups of first sets" is returned until a number of iterations reaches a first preset number of times to obtain a well-trained BP neural network that is the ECG mapping model.

The iterative layer is used to construct the first loss function, and update the weighting parameter of the hidden layer through a BP theorem, such that the standard ECG computing set is highly similar to the first input set. The first loss function is computed and the weighting parameter of the hidden layer is updated whenever the historical palm ECG episodes in the first input set are traversed completely.

Specifically, the first loss function is given by:

$$J' = \frac{1}{p'}\sum_{h=1}^{p'}(\hat{y}_h - y_h)^2 \quad (1)$$

In Eq. 1, J' is the first loss function, h=1, 2 ... p', $\hat{y}_h$ is a standard ECG computing episode corresponding to an hth historical palm ECG episode, and $y_h$ is a historical standard ECG episode corresponding to the hth historical palm ECG episode.

The above method cannot implement one iteration until the N/p' groups of first sets are completely input to the hidden layer, and the weighting parameter of the hidden layer is updated according to the output standard ECG computing set; and when the number of iterations reaches the first preset number of times, the well-trained BP neural network is obtained. In order to further improve the accuracy of the well-trained BP neural network, the network is tested again with the data in the test set, and the weighting parameter of the hidden layer is updated again to obtain the final BP neural network that is the ECG mapping model.

As an optional implementation, before the BP neural network is trained to obtain the ECG mapping model, the mapping method in the embodiment further includes: an initial weighting parameter of the hidden layer in the BP neural network is determined with a sparse autoencoder; and the BP neural network is constructed to perform supervised learning on a learning result of the sparse autoencoder, thereby tuning the weighting parameter of the BP neural network. With the strong expressive ability and all advantages of the deep neural network (DNN), the sparse autoencoder overcomes the locally optimal defect of the BP neural network and ensures the reliability of the ECG mapping model fundamentally.

Figure 6:
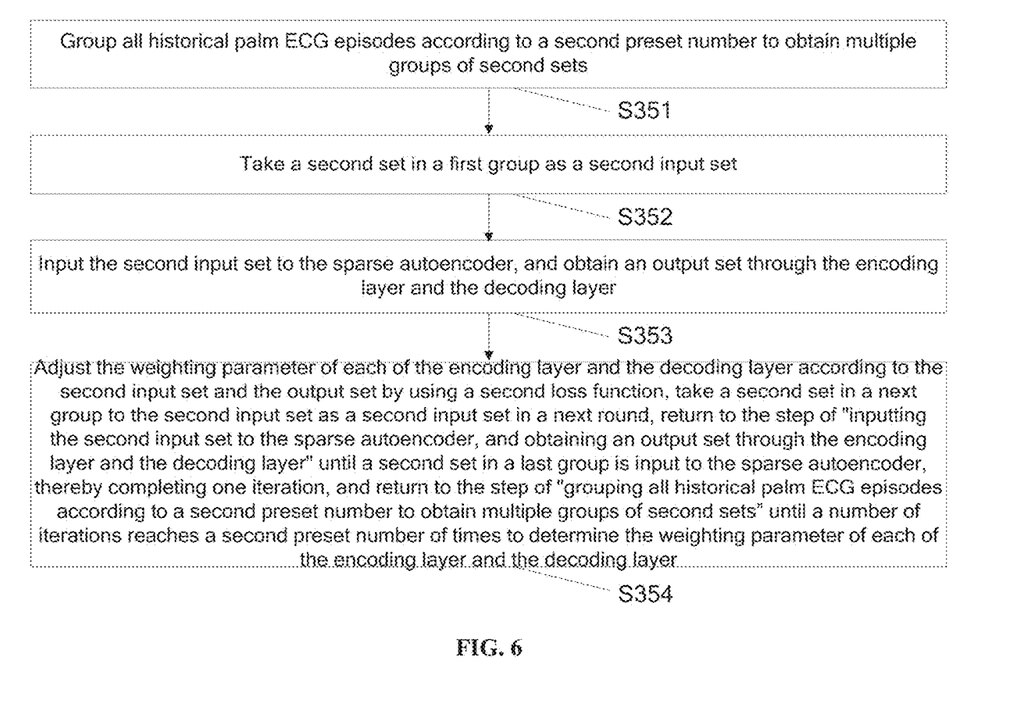
FIG. 6 is a flow chart of a method for determining an initial weighting parameter of a BP neural network according to Embodiment 1 of the present disclosure.

Specifically, the step of determining an initial weighting parameter of the hidden layer in the BP neural network with a sparse autoencoder may include: characteristics of the historical palm ECG episodes are learnt through the sparse autoencoder according to all historical palm ECG episodes to determine a weighting parameter of each of an encoding layer and a decoding layer in the sparse autoencoder; and the initial weighting parameter of the hidden layer in the BP neural network is determined according to the weighting parameter of the encoding layer. The hidden layer in the BP neural network is structurally identical to the encoding layer in the sparse autoencoder, namely the number of hidden layers in the BP neural network is the same as the number of hidden layers in the encoding layer of the sparse autoencoder; and as the number of neurons in each hidden layer is also the same, the weighting parameter as a result of the sparse autoencoder learning is taken as the initial weighting parameter of the hidden layer in the BP neural network.

As shown in FIG. 6, the self-supervised learning of the sparse autoencoder is implemented by taking input data as the labeled data for learning, and intended to extract the characteristics of the historical palm ECG episodes to the network weighting parameters of the encoding layer and the decoding layer. The learning process of the sparse autoencoder may include:

S351: All historical palm ECG episodes are grouped according to a second preset number to obtain multiple groups of second sets.

The sparse autoencoder includes an input layer, a Mini-batch layer, an encoding layer, a decoding layer, an output layer and an iterative layer.

The input layer has a dimension of N×Len, indicating that N historical palm ECG episodes each having a length of Len are formed into a training matrix.

On the Mini-batch layer, the historical palm ECG episodes are grouped according to the second preset number p; and each group includes p historical palm ECG episodes and there are N/p groups of second sets in total. The historical palm ECG episodes in each group of second set enter the encoding layer one by one, namely the dimension of the data entering the encoding layer is 1×Len. The first preset number and the second preset number may be the same, and may also be different.

S352: A second set in a first group is taken as a second input set.

S353: The second input set is input to the sparse autoencoder, and an output set is obtained through the encoding layer and the decoding layer.

Figure 7:
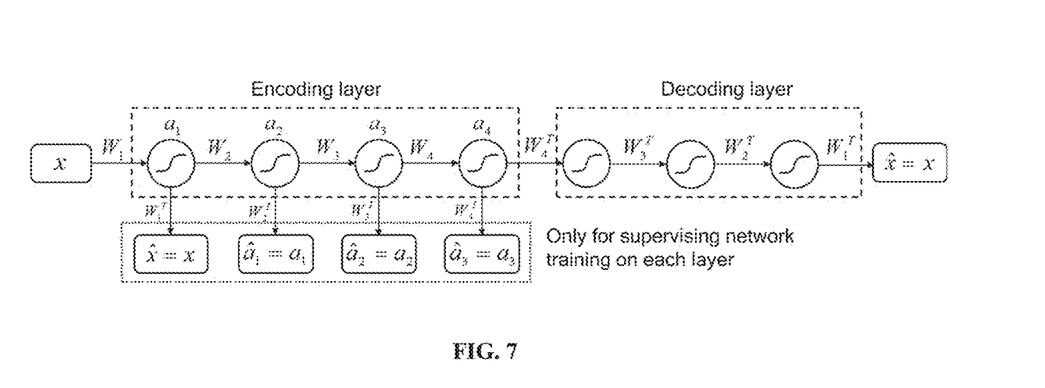
FIG. 7 is a schematic structural diagram of an encoding layer and a decoding layer according to Embodiment 1 of the present disclosure.
Figure 8:
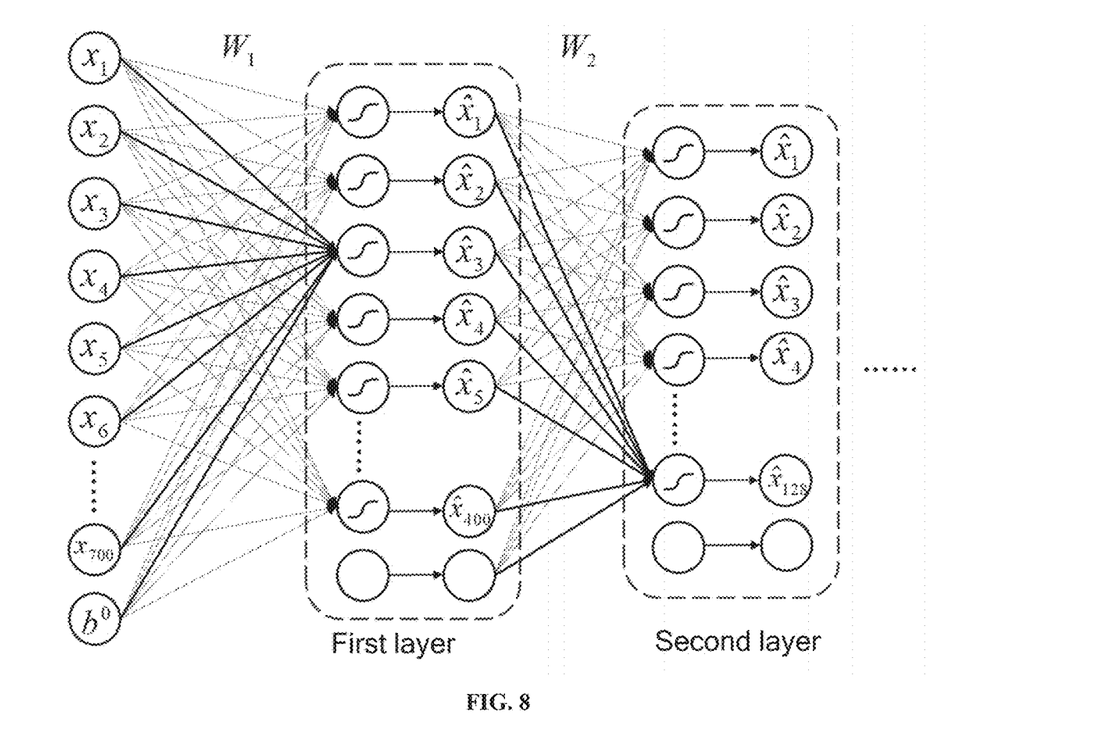
FIG. 8 is a schematic microgram of an encoding layer and a decoding layer according to Embodiment 1 of the present disclosure.

As shown in FIG. 7 and FIG. 8, the encoding layer is composed of l hidden layers, and the number of neurons on each hidden layer is s(1), s(2), . . . s(l), respectively. The weight matrix $W_1$ having a dimension of Len×s(1) is connected between the input layer and the encoding layer. When a=2, 3, . . . l, the weight matrix $W_a$ having a dimension of s(a−1)×s(a) is provided between an ath hidden layer and an (a−1)th hidden layer in the encoding layer.

The decoding layer is composed of l−1 hidden layers, and the number of neurons on each hidden layer is s(l−1), s(l−2), . . . s(l), respectively. The weight matrix $W_l^T$ having a dimension of s(l)×s(l−1) is connected between the decoding layer and the encoding layer. When b=2, 3, . . . l−1, the weight matrix $W_{l+1-b}^T$ having a dimension of s(l+1−b)×s(l−b) is provided between a bth hidden layer and a (b−1)th hidden layer in the decoding layer.

Both the encoding layer and the decoding layer use a Sigmoid function as an activation function for the neurons, and the result output from each neuron is the degree of activation. Thus, the degree $a_k^{(i)}$ of activation for a kth neuron in an ith hidden layer is given by:

$$a_k^{(i)} = \begin{cases} \text{sigmoid}(W_{k,1}^{(1)} x_1 + W_{k,2}^{(1)} x_2 + \ldots + \\ \quad W_{k,Len}^{(1)} x_{Len} + b_k) & i = 1 \\ \text{sigmoid}(W_{k,1}^{(i)} \hat{x}_1^{(i-1)} + W_{k,2}^{(i)} \hat{x}_2^{(i-1)} + \ldots + \\ \quad W_{k,s(i-1)}^{(i)} \hat{x}_{s(i-1)}^{(i-1)} + b_k^{(i-1)}) & i = 2, 3, \ldots 2l-1 \end{cases} \quad (2)$$

In Eq. 2, $W_{k,l}^{(1)}$ is a weighting coefficient for the kth neuron in the first hidden layer and the first neuron in the input layer, $x_1$ is a first element in the input layer, $b_k$ is a constant offset in the input layer, $W_{k,s(i-1)}^{(i)}$ is a weighting coefficient for the kth neuron in the ith hidden layer and the s(i−1)th neuron in the (i−1)th hidden layer, $\hat{x}_{s(i-1)}^{(i-1)}$ is a s(i−1)th element in the (i−1)th hidden layer, and $b_k^{(i-1)}$ is a constant offset in the (i−1)th hidden layer.

The output layer connected to the decoding layer has a dimension of s(1)×Len, and the ECG data output therefrom have the dimension of 1×Len. The output set having a dimension of p×Len cannot be obtained until the p historical palm ECG episodes are completely processed by the encoding layer and the decoding layer.

S354: The weighting parameter of each of the encoding layer and the decoding layer is adjusted according to the second input set and the output set by using a second loss function, a second set in a next group to the second input set is taken as a second input set in a next round, the step of "inputting the second input set to the sparse autoencoder, and obtaining an output set through the encoding layer and the decoding layer" is returned until a second set in a last group is input to the sparse autoencoder, thereby completing one iteration, and the step of "grouping all historical palm ECG episodes according to a second preset number to obtain multiple groups of second sets" is returned until a number of iterations reaches a second preset number of times to determine the weighting parameter of each of the encoding layer and the decoding layer. The first preset number of times and the second preset number of times may be the same, and may also be different.

The iterative layer is used to construct the second loss function, and update the weighting parameter of each of the encoding layer and the decoding layer through a BP theorem, such that the output set infinitely approaches to the second input set. The second loss function is computed and the weighting parameter of each of the encoding layer and the decoding layer is updated whenever the historical palm ECG episodes in the second input set are traversed completely.

The second loss function is given by:

$$J = \sum_{c=1}^{p} \|x_c - \hat{x}_c\|^2 + \beta \sum_{i=1}^{2l-1} \sum_{k=1}^{s(i)} KL(\rho \| \hat{\rho}_k^{(i)}) \quad (3)$$

In Eq. 3, J is the second loss function, c=1, 2, . . . p, $x_c$ is a cth input historical palm ECG episode, $\hat{x}_c$ is a cth output ECG data, and β is a weight for controlling a sparse term, the sparse term being a sum of relative entropies of all hidden layers.

The relative entropy of the ith hidden layer is given by:

$$\sum_{k=1}^{s(i)} KL(\rho \| \hat{\rho}_k^{(i)}) = \sum_{k=1}^{s(i)} \rho \ln\left(\frac{\rho}{\hat{\rho}_k^{(i)}}\right) + (1-\rho)\ln\left(\frac{1-\rho}{1-\hat{\rho}_k^{(i)}}\right) \quad (4)$$

In Eq. 4, ρ is an artificially set sparse constant, and $\hat{\rho}_k^{(i)}$ is an average degree of activation of the kth neuron in the ith hidden layer to the p historical palm ECG episodes.

The above method cannot implement one iteration until the N/p groups of second sets are completely input to the encoding layer and the decoding layer, and the weighting parameter of each of the encoding layer and the decoding layer is updated according to the output set; and when the number of iterations reaches the second preset number of times, the weighting parameter of each of the encoding layer and the decoding layer is obtained, and thus the initial weighting parameter of the hidden layer in the BP neural network is obtained.

The method in the embodiment further includes: the preset intercepted length is determined according to RR intervals of all historical standard ECG signals. Specifically, a maximum value in the RR segments can be selected as the preset intercepted length.

Figure 9:
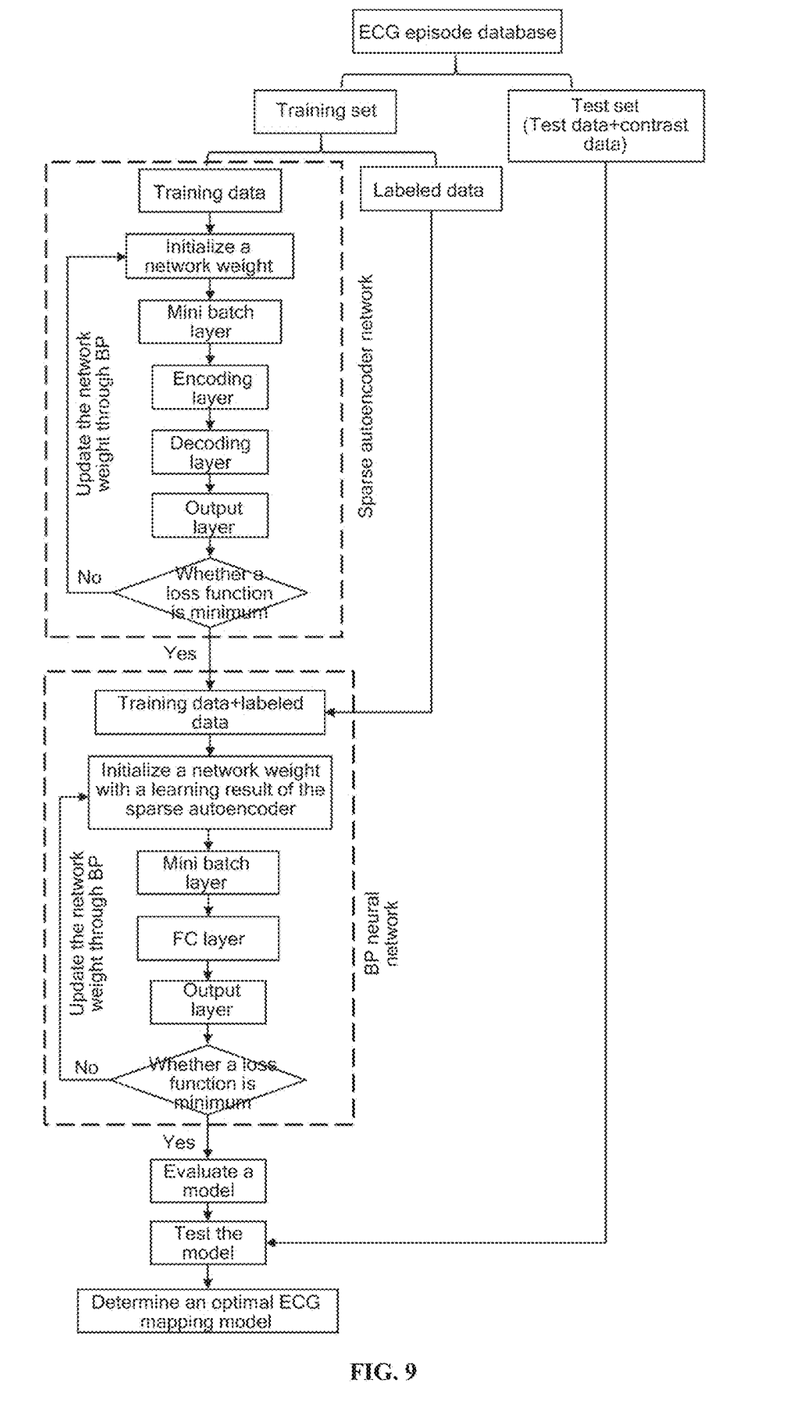
FIG. 9 is a schematic diagram for determining an ECG mapping model according to Embodiment 1 of the present disclosure.

To make the person skilled in the art understand the process for training the ECG mapping model in the embodiment more clearly, the training process is further described according to the schematic diagram shown in FIG. 9. The training process includes the following steps: Step 1: ECG signals of multiple subjects are acquired; Step 2: an ECG episode database is established; Step 3: a training set and a test set are classified; Step 4: a sparse autoencoder is constructed to perform unsupervised learning; Step 5: a BP neural network is constructed to perform supervised learning on the basis of a learning result in Step 4; and Step 6: an optimal ECG mapping model is determined.

In the embodiment, the RR intervals of all historical standard ECG signals are computed; the maximum value of 700 in all RR intervals is selected as the preset intercepted length; and with the R wave as the reference point, 300 points are intercepted in the reverse direction of the time axis, and 400 points are intercepted in the forward direction of the time axis. One ECG episode includes 700 points.

The sparse autoencoder includes an input layer, a Mini-batch layer, an encoding layer, a decoding layer, an output layer and an iterative layer.

The input layer has a dimension of 390×700, indicating that 390 historical palm ECG episodes each having a length of 700 points are formed into a training matrix.

On the Mini-batch layer, the 390 historical palm ECG episodes are grouped according to the second preset number 30. There are 13 groups in total, with each group including 30 data. The data entering the encoding layer have a dimension of 1×700.

The decoding layer is composed of four hidden layers, and the number of neurons on each hidden layer is 400, 128, 64 and 30, respectively. The weight matrix $W_1$ having a dimension of 700×400 is connected between the encoding layer and the input layer.

The decoding layer is composed of three hidden layers, and the number of neurons on each hidden layer is 64, 128 and 400, respectively. The weight matrix $W_4^T$ having a dimension of 30×64 is connected between the decoding layer and the encoding layer.

Both the encoding layer and the decoding layer use a Sigmoid function as an activation function for the neurons, and the result output from each neuron is the degree of activation.

The weight matrix $W_1^T$ having a dimension of 400×700 is connected between the WT output layer and the decoding layer. The output ECG data have the dimension of 1×700 The output set having a dimension of 30×700 cannot be output until the 30 historical palm ECG episodes are completely processed by the encoding layer and the decoding layer.

The iterative layer is used to construct the second loss function, and update the weighting parameter of each of the encoding layer and the decoding layer through a BP theorem, such that the output set infinitely approaches to the second input set. The second loss function is computed and the weighting parameter is updated whenever the historical palm ECG episodes in the second input set are traversed completely. After the 13 groups of second sets are traversed, one iteration is ended. The preset number of iterations is 1,000 times in the embodiment.

The BP neural network includes an input layer, a Mini-batch layer, a hidden layer, an output layer and an iterative layer.

The input layer takes 80% of historical palm ECG episodes as the training data, with a dimension of 390×700, and 80% of historical standard ECG episodes as the labeled data, with a dimension of 390×700 It further takes 20% of historical palm ECG episodes as the test data, with a dimension of 98×700, and 20% of historical standard ECG episodes as the contrast data, with a dimension of 98×700.

On the Mini-batch layer, the historical palm ECG episodes are grouped according to the first preset number 13; and each group includes 13 historical palm ECG episodes and there are 30 groups in total. The dimension of the data entering the hidden layer is 1×700.

There are four hidden layers, and the number of neurons on each hidden layer is 400, 128, 64 and 30, respectively, which is structurally identical to the encoding layer of the sparse autoencoder. A weighting network is directly constructed between the last hidden layer (namely the hidden layer of which the number of neurons is 30) and the output layer of which the number of neurons is 700.

The weighting parameter of the encoding layer as a result of the sparse autoencoder learning serves as the initial weighting parameter of the hidden layer in the BP neural network.

The dimension for the standard ECG computing episodes on the output layer is 1×700 After the 13 historical palm ECG episodes are completely processed by the hidden layer, the standard ECG computing set having a dimension of 13×700 is output.

The iterative layer is used to construct the first loss function, and update the weighting parameter through a BP theorem, such that the input and output are highly similar. The first loss function is computed and the weighting parameter is updated whenever ECG data in one group are traversed. After the 30 groups are traversed, one iteration is ended.

S4: All standard ECG episodes are connected according to a connection sequence of the multiple palm ECG episodes to obtain a standard ECG signal corresponding to the palm ECG signal.

Figure 10:
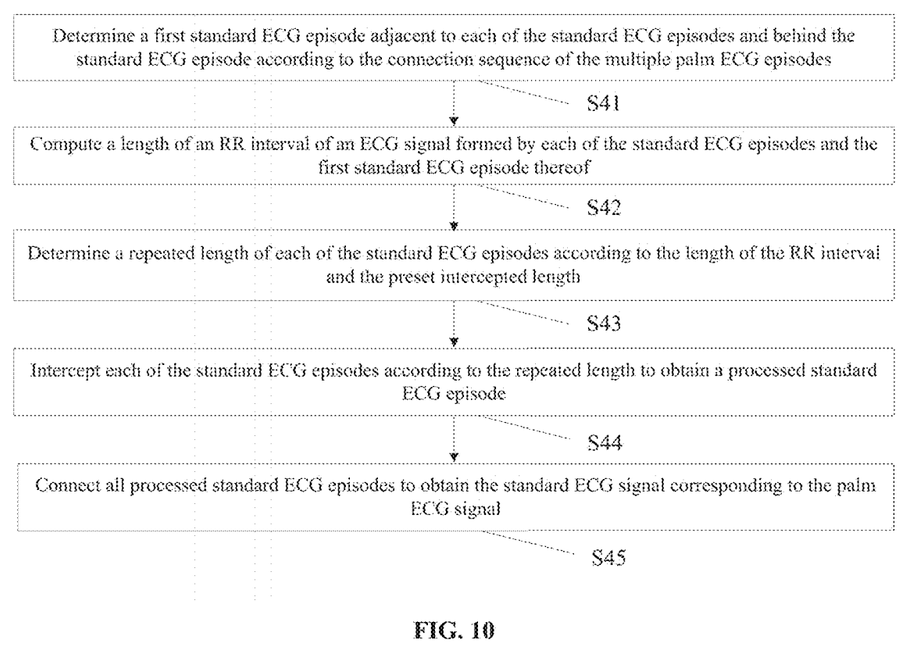
FIG. 10 is a flow chart of a method for connecting a standard ECG episode according to Embodiment 1 of the present disclosure.

Specifically, as shown in FIG. 10, S4 may include:

S41: A first standard ECG episode adjacent to each of the standard ECG episodes and behind the standard ECG episode is determined according to the connection sequence of the multiple palm ECG episodes.

S42: A length of an RR interval of an ECG signal formed by each of the standard ECG episodes and the first standard ECG episode thereof is computed.

S43: A repeated length in each of the standard ECG episodes is determined according to the length of the RR interval and the preset intercepted length.

$$d = Len - rr \quad (5)$$

In Eq. 5, d is the repeated length, and rr is the length of the RR interval.

S44: Each of the standard ECG episodes is intercepted according to the repeated length to obtain a processed standard ECG episode.

Specifically, from the tail of the standard ECG episode, the ECG signal having the repeated length is removed to obtain the processed standard ECG episode; and then a position where two adjacent standard ECG episodes are seamlessly connected is searched. The RR interval between two adjacent standard ECG episodes is restored normally by clipping.

S45: All processed standard ECG episodes are connected to obtain the standard ECG signal corresponding to the palm ECG signal.

The ECG mapping method in the embodiment can quickly map the palm ECG to the standard ECG based on the learning parameters in the ECG mapping model, thus providing accurate diagnostic references for the doctor and achieving more treatment time for patients. It is of great significance to the emergency use. In addition, the ECG mapping method may further be compiled into a functional program of the glove with a C language. Meanwhile, the determined network weighting parameters are converted into importing data, such that the glove can map the palm ECG independently. At last, the resulting ECG is synchronously displayed on the upper computer (mobile phone, tablet computer, PC computer and the like) for doctor's diagnosis. In the embodiment, the waveform conversion from the palm ECG to the standard ECG is implemented with the deep learning, and the mapped palm ECG can provide a more reliable reference for the doctor, which effectively prevents the misdiagnosis caused by the original palm ECG and improves the cure rate of the patient.

In addition, the ECG mapping method in the embodiment is applicable to each lead in the 12 leads. For each lead, the method can implement the conversion from the palm ECG to the standard ECG; and particularly for the lead-I and the lead-II, the acquired palm ECG varies a lot from the standard ECG, and consequently the method in the embodiment can prevent the misdiagnosis caused by the original palm ECG and improve the cure rate of the patients.

Embodiment 2

Figure 11:
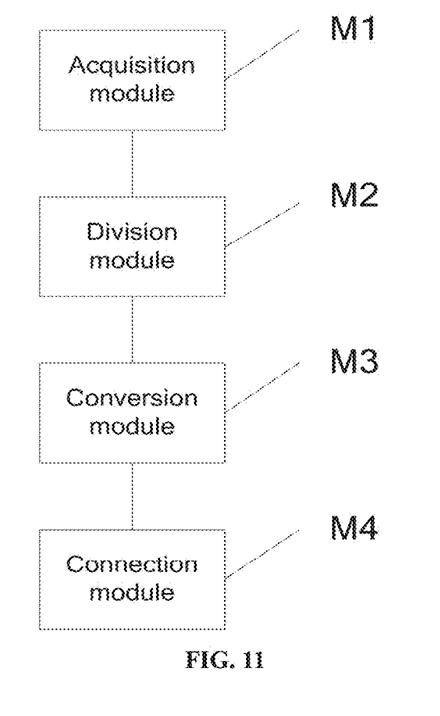
FIG. 11 is a block diagram of a mapping system according to Embodiment 2 of the present disclosure.

The embodiment provides an ECG mapping system. As shown in FIG. 11, the system includes:
an acquisition module M1, configured to acquire a palm ECG signal, the palm ECG signal including multiple complete ECG cycles;
a division module M2, configured to divide the palm ECG signal into multiple palm ECG episodes according to a preset intercepted length;
a conversion module M3, configured to convert the palm ECG episodes into standard ECG episodes with an ECG mapping model; and
a connection module M4, configured to connect all standard ECG episodes according to a connection sequence of the multiple palm ECG episodes to obtain a standard ECG signal corresponding to the palm ECG signal.

Each embodiment of the present specification is described in a progressive manner, and each embodiment focuses on the difference from other embodiments. The same and similar parts between the embodiments may be referred to each other. Since the system disclosed in the embodiments corresponds to the method disclosed in the embodiments, the description is relatively simple, and reference can be made to the method description.

Specific embodiments are used to expound the principle and implementations of the present disclosure. The description of these embodiments is merely used to assist in understanding the method of the present disclosure and its core conception. In addition, those of ordinary skill in the art can make modifications in terms of specific implementations and scope of application based on the conception of the present disclosure. In conclusion, the content of this specification should not be construed as a limitation to the present disclosure.

What is claimed is:

1. An electrocardiogram (ECG) mapping method, comprising the following steps:
acquiring a palm ECG signal, the palm ECG signal comprising multiple complete ECG cycles;
dividing the palm ECG signal into multiple palm ECG episodes according to a preset intercepted length;
converting the palm ECG episodes into standard ECG episodes with an ECG mapping model;
connecting all standard ECG episodes according to a connection sequence of the multiple palm ECG episodes to obtain a standard ECG signal corresponding to the palm ECG signal;
the ECG mapping method further comprising: training a back propagation (BP) neural network to obtain the ECG mapping model, and comprising:
acquiring multiple historical palm ECG signals and multiple historical standard ECG signals, wherein the historical palm ECG signals are in one-to-one correspondence with the historical standard ECG signals, and the historical palm ECG signals and the historical standard ECG signals each comprise multiple complete ECG cycles;
respectively dividing the historical palm ECG signals and the historical standard ECG signals according to the preset intercepted length to obtain multiple historical palm ECG episodes and multiple historical standard ECG episodes, wherein the historical palm ECG episodes and the historical standard ECG episodes are in one-to-one correspondence;
grouping all historical palm ECG episodes according to a first preset number to obtain multiple groups of first sets;
taking a first set in a first group as a first input set;
inputting the first input set to a hidden layer in the BP neural network to obtain a standard ECG computing set; and
adjusting a weighting parameter of the hidden layer according to the standard ECG computing set and the first input set by using a first loss function, taking a first set in a next group to the first input set as a first input set in a next round, returning to the step of "inputting the first input set to a hidden layer in the BP neural network to obtain a standard ECG computing set" until a first set in a last group is input to the hidden layer, thereby completing one iteration, and returning to the step of "grouping all historical palm ECG episodes according to a first preset number to obtain multiple groups of first sets" until a number of iterations reaches a first preset number of times to obtain a well-trained BP neural network that is the ECG mapping model;
before the training a BP neural network to obtain the ECG mapping model, further comprising: determining an initial weighting parameter of the hidden layer in the BP neural network with a sparse autoencoder;
wherein the determining an initial weighting parameter of the hidden layer in the BP neural network with a sparse autoencoder comprises:
learning characteristics of the historical palm ECG episodes through the sparse autoencoder according to all historical palm ECG episodes to determine a weighting parameter of each of an encoding layer and a decoding layer in the sparse autoencoder; and
determining the initial weighting parameter of the hidden layer in the BP neural network according to the weighting parameter of the encoding layer;
wherein the learning characteristics of the historical palm ECG episodes through the sparse autoencoder according to all historical palm ECG episodes to determine a weighting parameter of each of an encoding layer and a decoding layer in the sparse autoencoder comprises:
grouping all historical palm ECG episodes according to a second preset number to obtain multiple groups of second sets;
taking a second set in a first group as a second input set;
inputting the second input set to the sparse autoencoder, and obtaining an output set through the encoding layer and the decoding layer; and
adjusting the weighting parameter of each of the encoding layer and the decoding layer according to the second input set and the output set by using a second loss function, taking a second set in a next group to the second input set as a second input set in a next round, returning to the step of "inputting the second input set to the sparse autoencoder, and obtaining an output set through the encoding layer and the decoding layer" until a second set in a last group is input to the sparse autoencoder, thereby completing one iteration, and returning to the step of grouping all historical palm ECG episodes according to a second preset number to obtain multiple groups of second sets until a number of iterations reaches a second preset number of times to determine the weighting parameter of each of the encoding layer and the decoding layer.

2. The ECG mapping method according to claim 1, wherein the dividing the palm ECG signal into multiple palm ECG episodes according to a preset intercepted length comprises:

taking R waves in the palm ECG signal as reference points;

intercepting, for each of the reference points, a palm ECG signal having a length of $D_1$ in a in a reverse direction of a time axis, and a palm ECG signal having a length of $D_2$ in a forward direction of the time axis to obtain a palm ECG episode corresponding to the reference point, a sum of the $D_1$ and the $D_2$ being the preset intercepted length; and dividing the palm ECG signal into the multiple palm ECG episodes through multiple reference points.

3. The ECG mapping method according to claim 1, further comprising: determining the preset intercepted length according to RR intervals of all historical standard ECG signals.

4. The ECG mapping method according to claim 3, wherein the determining the preset intercepted length according to RR intervals of all historical standard ECG signals comprises: selecting a maximum value in all RR intervals as the preset intercepted length.

5. The ECG mapping method according to claim 2, wherein the connecting all standard ECG episodes according to a connection sequence of the multiple palm ECG episodes to obtain a standard ECG signal corresponding to the palm ECG signal comprises:

determining a first standard ECG episode adjacent to each of the standard ECG episodes and behind the standard ECG episode according to the connection sequence of the multiple palm ECG episodes;

computing a length of an RR interval of an ECG signal formed by each of the standard ECG episodes and the first standard ECG episode thereof;

determining a repeated length of each of the standard ECG episodes according to the length of the RR interval and the preset intercepted length;

intercepting each of the standard ECG episodes according to the repeated length to obtain a processed standard ECG episode; and connecting all processed standard ECG episodes to obtain the standard ECG signal corresponding to the palm ECG signal.

* * * * *